(12) United States Patent
Bruno et al.

(10) Patent No.: US 6,181,848 B1
(45) Date of Patent: *Jan. 30, 2001

(54) TEMPERATURE-INDEPENDENT OPTICAL MULTIPLEXER AND/OR DEMULTIPLEXER

(75) Inventors: Adrien Bruno, Palaiseau; Arnaud Rigny, Bagneux, both of (FR)

(73) Assignee: France Telecom (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/995,965

(22) Filed: Dec. 22, 1997

(30) Foreign Application Priority Data

Dec. 23, 1996 (FR) .................................................. 96 15855

(51) Int. Cl.$^7$ .................................................. G02B 6/293
(52) U.S. Cl. .................................. 385/24; 385/15; 385/39
(58) Field of Search .................................. 385/27, 31, 39, 385/42, 49, 15, 24, 37

(56) References Cited

U.S. PATENT DOCUMENTS

| | | | |
|---|---|---|---|
| 5,341,444 | * 8/1994 | Henry et al. | 385/11 |
| 5,623,571 | * 4/1997 | Chou et al. | 385/130 |
| 5,799,118 | * 8/1998 | Ogusu et al. | 385/14 |
| 5,838,844 | * 11/1998 | Van Dam et al. | 385/14 |
| 5,982,960 | * 11/1999 | Akiba et al. | 385/24 |
| 6,049,640 | * 4/2000 | Doerr | 385/15 |

FOREIGN PATENT DOCUMENTS

| | | | |
|---|---|---|---|
| 0662621 | 7/1995 | (DE) | 385/14 |
| 2732777 | 10/1996 | (FR) . | |

OTHER PUBLICATIONS

Patent Abstracts of Japan; vol. 018, No. 146 (p. 1707) Mar. 10, 1994.

Rigny A et al. Taper Assisted Polarisation Compensation in Efficiently Fibre Coupled Inp Demultiplexer Metal Finishing; vol. 32, No. 20, Sep. 26, 1996.

Bissessur H at al. "Extremely Small Polarization Independent Phased Array Demultiplexers on INP" vol. 8, No. 4 Apr. 1, 1996.

* cited by examiner

Primary Examiner—John D. Lee
(74) Attorney, Agent, or Firm—Blakely Sokoloff Taylor & Zafman

(57) ABSTRACT

The present invention concerns a device forming an optical multiplexer and/or demultiplexer of the type including two plane optical surfaces separated by an array of waveguides having controlled differences in length, wherein each waveguide comprises at least two spans placed in series and having respective lengths and refractive indices that are suitable for controlling the influence of temperature variations on the device.

10 Claims, 4 Drawing Sheets

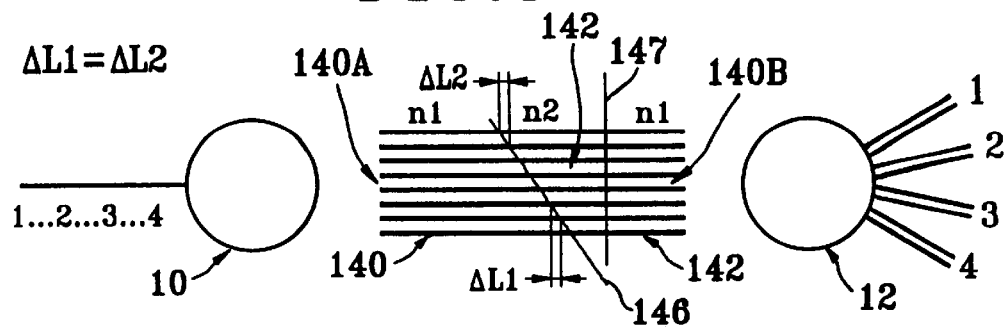
FIG. 5
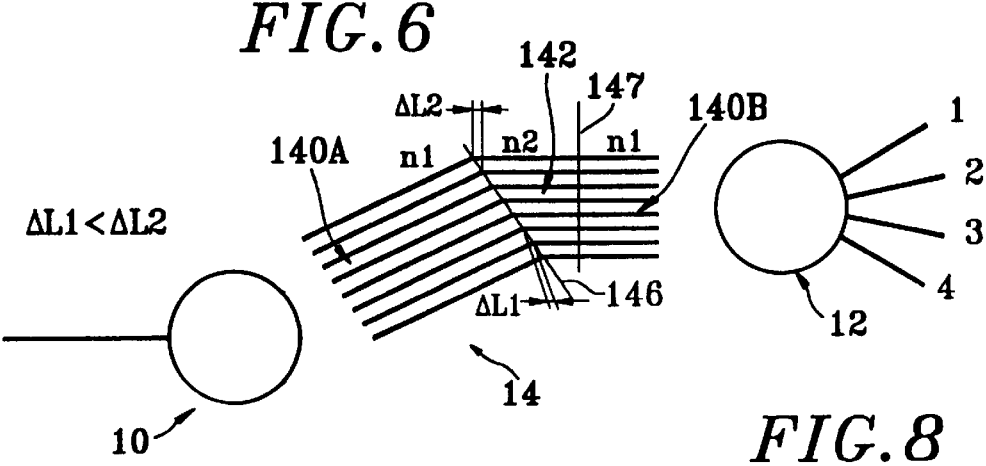
FIG. 6
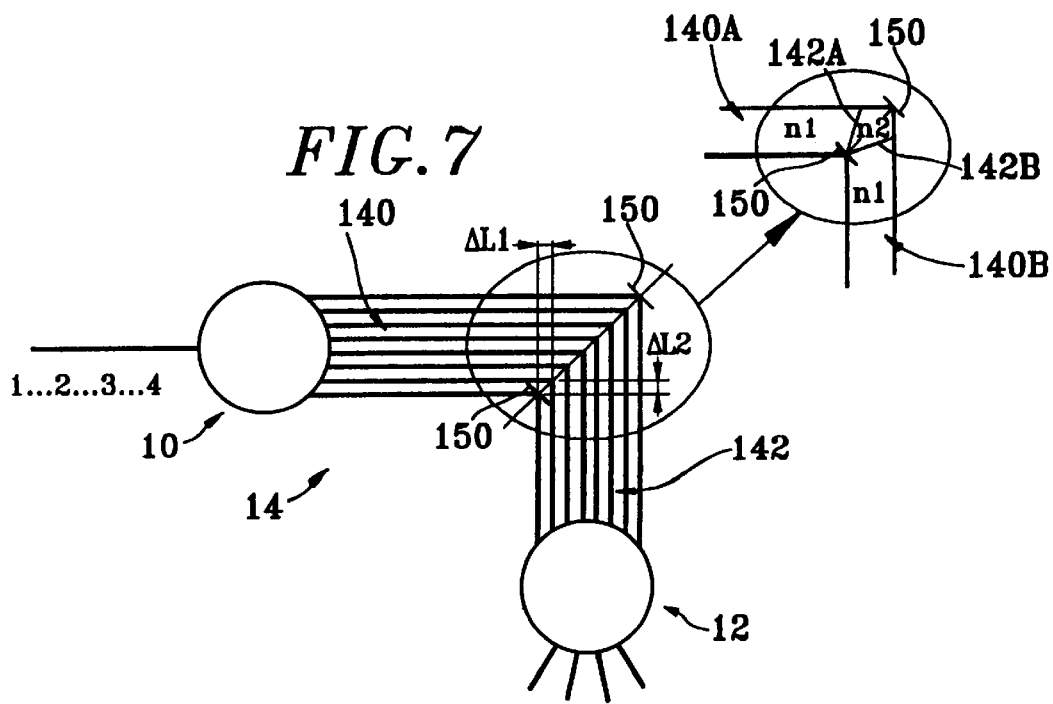
FIG. 7
FIG. 8

▨ Photolithographic resin
▨ Nitride

TEMPERATURE-INDEPENDENT OPTICAL MULTIPLEXER AND/OR DEMULTIPLEXER

FIELD OF THE INVENTION

The present invention relates to the technical field of light guides.

The present invention proposes an optical multiplexer and/or demultiplexer usable in the fields of telecommunications and of remote sensors.

The device of the invention may constitute an optical receiver for a direct-detect reception circuit, e.g. for optical-link systems. Such a device may be advantageous for separating signals of different wavelengths arriving over a common fiber so as to distribute them to different users, each receiving a specific wavelength.

The device of the invention may also be coupled (in hybrid or integrated manner) with transmission lasers or optical amplifiers.

The device of the invention is particularly advantageous in switching, cross-connection, and local loop functions. It may be also used in optical interconnections between, for example, highly integrated high-speed electronic chips, or between computers, or else within a computer.

BACKGROUND OF THE INVENTION

Various optical multiplexer and/or demultiplexer structures have been described in the literature.

For example, reference may be made to the following documents:

[1] ECOC 96, "Extremely compact 1.31 $\mu$m–1.55 $\mu$m phased array duplexer on InP with −30 dB crosstalk over 100 nm", R. Mestric et al., which describes a duplexer having two wavelengths: 1.3 $\mu$m and 1.55 $\mu$m; and

[2] ECOC 96, "Compact low loss 8×10 GHz polarisation independent WDM receiver", C.A.M. Steenbergen et al., which describes an integrated demultiplexer having detectors, and proposes to use two waveguide structures to solve the problem of polarisation.

The (de)multiplexers that are generally used today are of the type having an array of waveguides, as shown in accompanying FIG. 1. Such a demultiplexer is made up of two plane optical surfaces 10 and 12 separated by an array 14 of waveguides. The difference in path length $\Delta L$ between two consecutive waveguides 14 is constant, and it makes it possible to perform phase-shifting, and therefore demultiplexing. In FIG. 1, P1 represents the equiphase plane for an input signal while P2 represents the equiphase plane for a signal coming from one of the outlets.

Such known multiplexers/demultiplexers have already done good service. Unfortunately, they are not entirely satisfactory.

The main drawback with such known devices is their high degree of temperature dependency which is intrinsic to the material used.

The refractive index of the material varies as a function of temperature, and so the path-length difference between two consecutive waveguides changes with changing temperature, thereby causing the peaks to be offset relative to the output waveguides.

$SiO_2$ has a coefficient of variation of refractive index as a function of temperature that is small (giving rise to an offset of about 1 nm per 100° C.). Unfortunately, that material offers only limited possibilities as regards monolithic integration (integration on the same material) of devices such as lasers, optical amplifiers, or detectors.

Monolithic integration, which enables production costs to be reduced (compared with hybridizing on different materials), is possible on InP. Unfortunately, the refractive index of InP varies considerably with temperature (giving rise to an offset of about 1 nm per 10° C.). The Publication [3] "Polarisation independent 8×8 waveguide grating multiplexer on InP", Electronics Letters, Jan. 21, 1993, vol. 29, No. 2, M. Zirngibl et al., gives a variation of 1.5 nm per 10° C. That heavy dependency requires the temperature to be controlled by means external to the device, e.g. in the form a Peltier-effect element, which increases the cost of implementing the device.

Naturally, for a wide-line demultiplexer with a small number of lines, such as the 2-line duplexer in reference [1] ECOC 96 with lines of 100 nm, temperature does not disturb demultiplexing or disturbs it only slightly. However, for a multi-wavelength application, and lines of 0.65 nm, the temperature instability must be controlled.

OBJECTS AND SUMMARY OF THE INVENTION

An object of the present invention is to provide a device making it possible to reduce and/or to cancel out the effect of temperature on a (de)multiplexing device without it being necessary to take any action external to the device, and regardless of the material used ($SiO_2$, InP, polymer, $Al_2O_3$, $LiNbO_3$, etc.)

An additional object of the present invention is to provide a device organized either to reduce the effect of temperature, or to increase it to offer means of controlling the signal, by means of temperature on the desired channel. In this way, the invention makes it possible to offer greater tolerance as regards the geometrical configuration of the device.

By cancelling out the effect of temperature, it is no longer necessary to provide an external regulation device.

The invention achieves the above-mentioned objects by means of a device forming an optical multiplexer and/or demultiplexer of the type including two zones that are not guided laterally, that act as planar lenses, and that are separated by an array of waveguides having controlled differences in length, wherein each waveguide comprises at least two spans placed in series and having respective lengths and refractive indices that are suitable for controlling the positions at which various wavelengths are output from the device, which positions depend on fluctuations in temperature.

In a first embodiment of the present invention, the refractive indices of the materials of both spans of each waveguide vary as a function of temperature in the same direction, and the two spans have respective lengths that vary in opposite directions from one guide to another.

In a second embodiment of the present invention, the refractive indices of the materials of the two spans of each guide vary as a function of temperature in opposite directions, and the two spans have respective lengths that vary in the same direction from one waveguide to another.

The present invention thus proposes a (de)multiplexer that is either temperature independent, or that has temperature dependence ($d\lambda/dT$) that is chosen and desired.

BRIEF DESCRIPTION OF THE DRAWINGS

Other characteristics, objects, and advantages of the invention appear on reading the following detailed description with reference to the accompanying drawings which are given by way of non-limiting example and in which:

FIGS. 4, 5, and 6 are diagrammatic plan views of three variant structures of the device in a first main embodiment of the invention;

FIGS. 7, 8, and 9 are diagrammatic plan views of three variant structures of the device in a second main embodiment of the invention;

FIGS. 11C and 11D are vertical section views respectively through the second span of the structure and through the first span thereof after the first etching step, while

MORE DETAILED DESCRIPTION

As indicated above, the invention concerns an optical multiplexer and/or demultiplexer device of the type including two integrated lenses 10 and 12, e.g. placed one in front of an input waveguide and the other in front of a plurality of output waveguides, or else one in front of a plurality of input waveguides, and the other in front of an output waveguide, said integrated lenses 10, 12 further being placed between an array or sheet of waveguides 14 having controlled path-length differences $\Delta L$ in pairs. More precisely, the invention proposes a structure making it possible to control the influence of temperature on such a device.

The invention is based on the following analysis.

The equation giving the center wavelength of a phasar-type demultiplexer comprising a series of optical waveguides placed between two plane optical surfaces is as follows: $\lambda = n\Delta L/m$ where n represents the effective index of the waveguide used in the sheet of waveguides 14, $\Delta L$ represents the difference in optical path length between two consecutive waveguides, and m represents the order of interference.

The variation in wavelength as a function of temperature is thus, by differentiation:

$$d\lambda/dT = (dn/dT)\Delta L/m$$

and is therefore related directly to the variation in refractive index as a function of temperature.

For reasons of simplicity, it is initially assumed that the term dn/dT also contains the path-length variation term; in fact $dn/dT \rightarrow (dn/dT) + (nd\Delta L/\Delta LdT)$.

To obtain total or partial temperature independence, each waveguide of the device of the present invention has at least two waveguide spans connected in series and having suitable respective path lengths and effective refractive indices.

Figure 1:
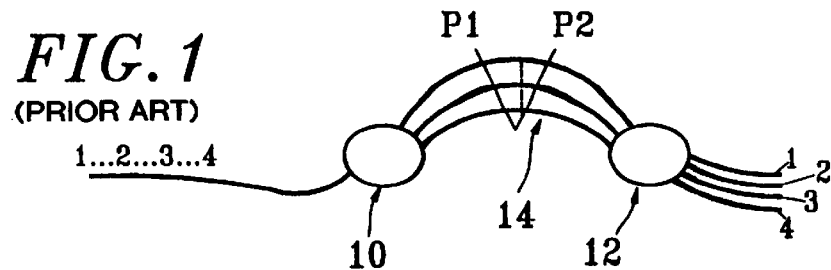
FIG. 1 is described above, and it diagrammatically shows the overall structure of a state-of-the-art demultiplexer.
Figure 2:
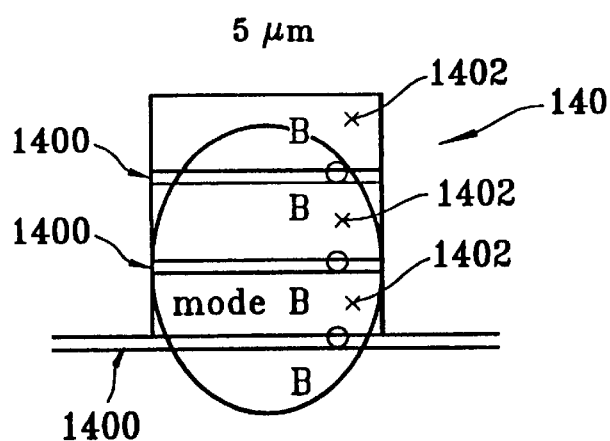
FIGS. 2 and 3 are vertical section views through two waveguide spans of the invention.

In FIG. 2, and the remaining accompanying figures, the two series spans are referenced 140 and 142.

More precisely, the present invention proposes two main embodiments.

In the first embodiment, the refractive indices of the materials of both spans 140, 142 of each waveguide 14 vary with temperature in the same direction, but the two spans 140, 142 have respective lengths that vary in opposite directions from one waveguide to another.

Figure 4:
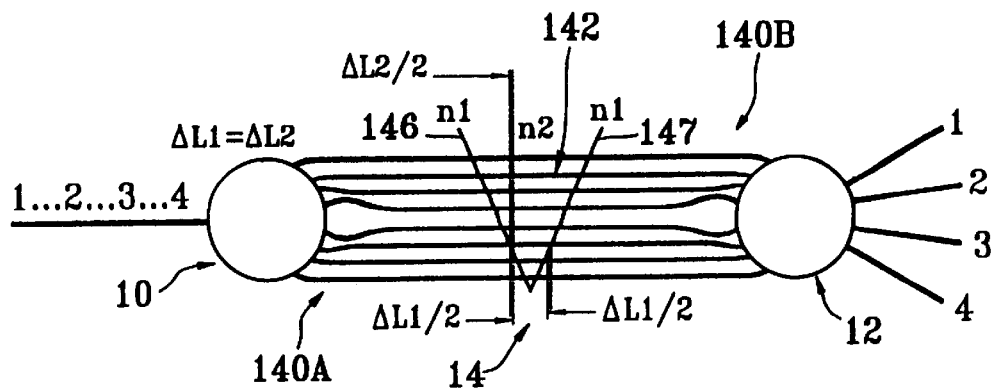

FIGS. 4, 5, and 6 show three variants of such a device.

The equation giving the center wavelength $\lambda$ as a function of the difference between the path lengths of two consecutive guides in such a structure is as follows:

$$m\lambda = n1\Delta L1 - n2\Delta L2 \quad (1)$$

where $\Delta L1 > 0$ is the difference between the path lengths of two consecutive waveguides 14 for the material of refractive index n1 forming respective first spans 140; and where $\Delta L2 > 0$ is the difference between the path lengths of two consecutive waveguides 14 for the material of refractive index n2 forming respective second spans 142.

The demultiplexer is designed such that $\Delta L2 = K\Delta L1$ where $k = (dn1/dT)/(dn2/dT) = K1/K2 > 0$, i.e. the refractive indices of the materials of both of the spans in series vary with temperature in the same direction if the effects of temperature are to be cancelled out.

Furthermore, for $\Delta L1$ to be small enough for a small phasar demultiplexer, n1−Kn2 must be large enough.

In the second embodiment, the refractive indices vary with temperature in opposite directions for the materials of the two spans 140, 142 of each waveguide 14, and the respective spans 140, 142 have lengths that vary in the same direction from one waveguide to another.

Figure 9:
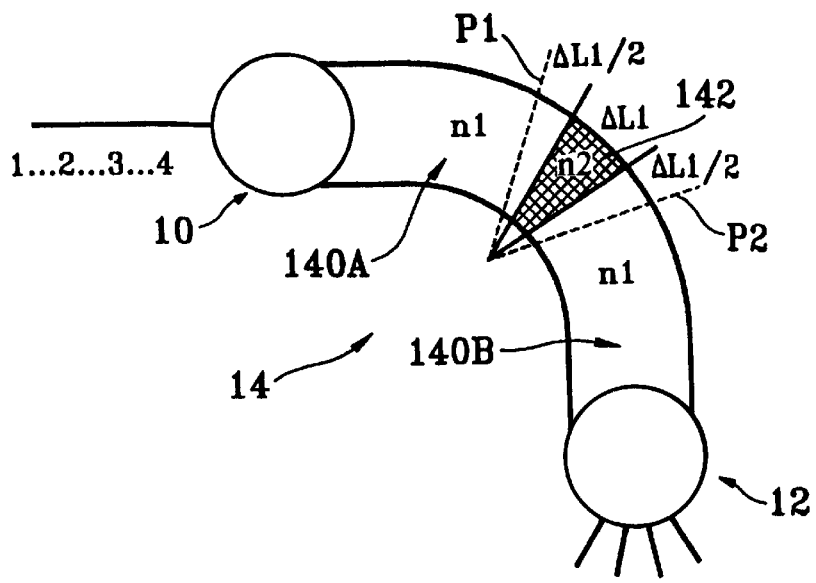

FIGS. 7, 8, and 9 show three variants of such a device.

The equation giving the center wavelength 1 as a function of the difference between the path lengths of two consecutive waveguides in such a structure is as follows:

$$m\lambda = n1\Delta L1 + n2\Delta L2 \quad (2)$$

where $\Delta L1 > 0$ is the difference between the path lengths of two consecutive waveguides 14 for the material of refractive index n1 forming respective first spans 140; and where $\Delta L2 > 0$ is the difference between the path lengths of two consecutive waveguides 14 for the material of refractive index n2 forming respective second spans 142.

The demultiplexer is designed such that $\Delta L2 = K\Delta L1$ where $k = -(dn1/dT)/(dn2/dT) > 0$, i.e. the refractive indices of the materials of the two spans in series vary with temperature in opposite directions if the effects of temperature are to be cancelled out.

In this case, the factor n1+Kn2 taken from $m\lambda = (n1+Kn2)\Delta L1$ is large enough for $\Delta L1$ to be small enough to implement a small phasar demultiplexer.

The variation in wavelength for the two above-mentioned geometrical configurations is as follows:

a) the following is taken from equation (1):

$$md\lambda/dT = (dn1/dT)\Delta L1 - (dn2/dT)\Delta L2$$

b) the following is taken from equation (2):

$$md\lambda/dT = (dn1/dT)\Delta L1 + (dn2/dT)\Delta L2$$

For $\Delta L2 = K\Delta L1$, $md\lambda/dT = 0$

Temperature independence is thus obtained with $\Delta L2 = K\Delta L1$.

To have predetermined temperature dependence different from that given by the materials, it is necessary merely to act on the geometric configuration of the phasar demultiplexer by modifying the $\Delta L2/\Delta L1$ ratio which may be greater than or less than K.

A description is given below of examples of the above-mentioned first embodiment in which the refractive indices of the materials of both series spans 140, 142 of each consecutive waveguide 14 vary with temperature in the same direction.

The following is deduced from equation (1):

$$m\lambda = (n1 - Kn2)\Delta L1$$

In these examples, the two series spans 140, 142 are formed of structures on InP substrate, the structures being composed of two stacks of different layers so as to implement the two waveguide spans. These two structures are shown respectively in accompanying FIGS. 2 and 3.

More precisely, in a particular embodiment, the first span 140 is made up of three thin layers 1400 (500 Å) of GaInAsP quaternary (gap of 1.3 μm) separated by layers 1402 of InP of thickness 0.55 μm. The first span 140 is made by etching (see FIG. 2) so as to define a strip of width 5 μm. The second span 142 is constituted by a quaternary GaInAsP waveguide 1420 (gap=1.3 μm) and by an overlying layer 1422 of InP of width 2 μm obtained by reactive ion etching (RIE). The mode is transferred from one waveguide structure 140 to the other waveguide structure 142 by via a mode matcher.

For example, such a mode matcher may be as defined in the teaching of Document [4] FR-A-2732777 (French Patent Application No. 95 04031).

The effective refractive index n1 of the first structure 140 is about 3.19, and the effective refractive n2 of the second structure 142 is 3.21. The variations of refractive index as a function of temperature are K1=0.127 nm/° C. for the first structure 140 and K2=0.15 nm/° C. for the second structure 142. K2>K1 since the gap 1.3 μm of the structure 142 is closer to the wavelength 1.54 μm than the equivalent gap 0.919 μm of the structure 140.

To the first order, it can be assumed that the variation in effective refractive index of the guided mode as a function of temperature T is equivalent to that of the material of the core of the waveguide. Thus n1−Kn2=0.47. For a wavelength of 1.54 μm with a width of window around this value of about 30 nm, the order m is 1540/30=50. A value of 164 μm is obtained for ΔL1. This represents a minimum length for the sheet of 40 waveguides of 164×40=6560 μm.

Figure 3:
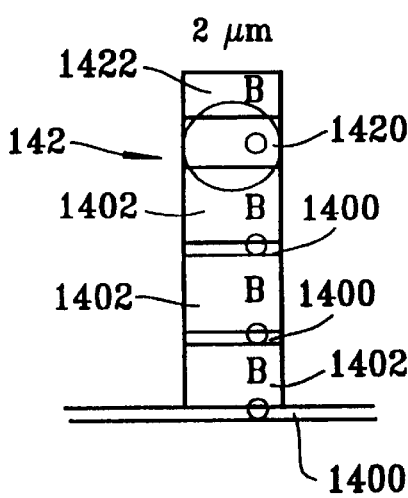

It should be noted that, as shown in FIGS. 2 and 3, the second structure 142 formed of layers 1420, 1422 is made above the first structure composed of the layers 1400 and 1402.

A particular method of making these structures, and in particular their mode matchers is described below.

Figure 11A:
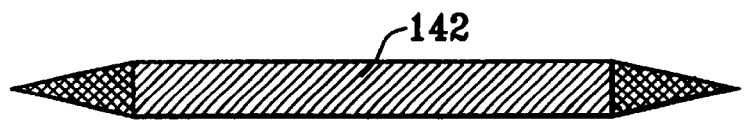
FIGS. 11A and 11B diagrammatically show two etching steps for obtaining mode-matching spans of the present invention.
Figure 11C:
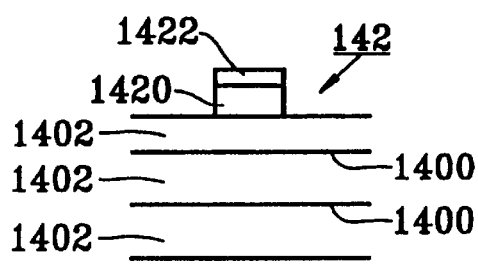
Figure 11D:
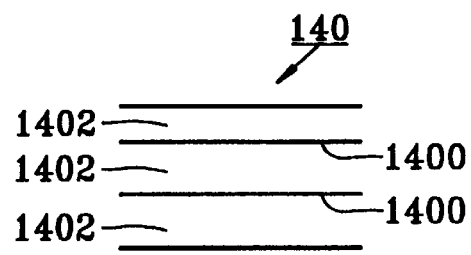
Figure 11B:
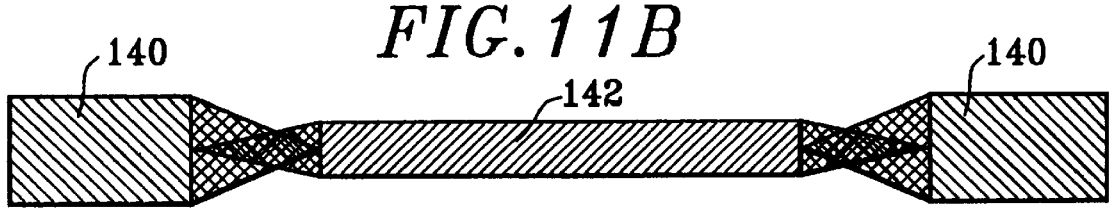
Figure 11E:
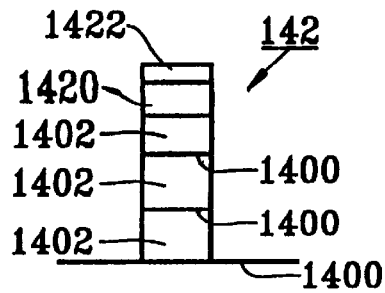
FIGS. 11E and 11F are similar vertical section views respectively through the second span and through the first span after the second etching step.
Figure 11F:
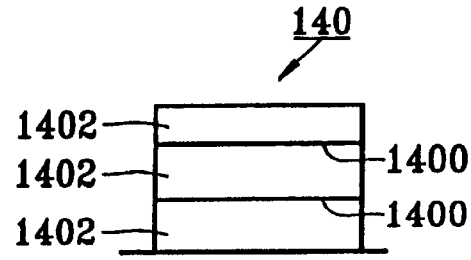

The mode matcher enabling energy to pass from one waveguide to the other without losses is made by means of two masks:

a first mask is used to make the strip 142 of width 2 μm with points at either end as shown in FIGS. 11A, 11C, and 11D, by etching the top Inp layer 1422 and the top GaInAsP layer 1420 above the three-layer structure 1400, 1402, over the zones serving to form the strip 142 (see FIG. 11C), and by removing completely the InP layer 1422 and the GaInAsP layer 1420 outside the above-mentioned zones and over the zones serving to form the span 140 (see FIG. 11D); and a second mask constituted by the SiNx of the first strip 142 is retained and protects it for the second etching step whereby the span 140 is made while the span 142 is completed by etching the three-layer structure (see FIGS. 11E and 11F).

FIGS. 11A and 11B show the configuration prior to removing the resin and the nitride, respectively after the first photolithography step and after the second photolithography step. The FIGS. 11C and 11D are vertical section views respectively through the second span 142 of the structure and through the first span 140 thereof after the first etching step, and FIGS. 11E and 11F are similar vertical section views respectively through the second span 142 and through the first span 140 after the second etching step.

For defining the second strip 140 of width 5 μm, the resin of the strip 142 is not protected so as to facilitate alignment with the first strip 142. Therefore, prior to defining the second strip, a first nitride is implemented that is thick enough to protect the strip 142 because a portion of said strip is etched after the second photolithography step.

FIGS. 4, 5, and 6 show two cases of the first embodiment of the invention: the case when K=1 (ΔL1=ΔL2) with two types of triangle delimiting the zone of the second spans 142 and making phase-shifting possible (FIGS. 4 and 5), and the case when K≠1 (FIG. 6).

In the three variants shown in FIGS. 4, 5, and 6, the waveguides 14 are formed of substantially rectilinear segments between the lenses 10, 12.

Each of the first spans 140 of a waveguide 14 is itself subdivided into two segments 140A, 140B flanking a second span 142.

In FIGS. 4 and 5, the segments 140A and 140B and the span 142 are substantially in alignment.

In FIG. 6, the span 142 and the segment 140B are substantially in alignment, while the segment 140A slopes relative thereto.

The zones where the second span 142 is connected to the respective segments 140A, 140B are referenced 146, 147.

The lengths of the second spans 142 vary in the opposite direction to the sums of the lengths of the respective segments 140A and 140B from one waveguide to another, by a constant pitch from any given waveguide to the following waveguide, the zone delimited by the set of second spans 142 between the respective segments 140A, 140B being generally triangular in shape.

More precisely, this zone is in the form of an isosceles triangle in FIG. 4, the midplane of symmetry of the second spans 142 being perpendicular to the general direction of the waveguides, and the connection zones being symmetrical about a plane orthogonal to this direction.

The zone of the second spans 142 in FIG. 5 is in the form of a right-angled triangle, the connection zone 146 sloping relative to the general direction of the waveguides, while the connection zone 147 is orthogonal to said general direction.

Naturally, intermediate variants of the two particular configurations shown in FIGS. 4 and 5 may be chosen, while satisfying ΔL1=ΔL2.

By examining FIG. 6, a person skilled in the art can easily understand that the variant shown in this figure makes it possible to obtain ΔL1<ΔL2, i.e. the lengths ΔL2 of the second spans 142 still vary from one waveguide 14 to another in a direction that is opposite from the variation in the sums of the lengths of the respective segments 140A, 140B, but they do so with an amplitude that is different from said variation in said sums. The angle between the direction of the waveguide segments 140A coming from the first plane optical surface 10 and the direction of the waveguide segments 140B entering the second plane optical surface 12 directly determines the ratio ΔL1/ΔL2.

It should be noted that, although the devices are long (about 1 mm), they are formed of waveguides of very small curvature. These waveguides thus make it possible to reduce propagation losses compared with a conventional temperature-dependent phasar demultiplexer curved-waveguide structure. To facilitate understanding, straight lines rather than curves are shown in the accompanying drawings. In practice, curvature and a mode matcher are necessary to reduce connection losses between the structures of refractive index n1 and n2, i.e. between the segments 140A, 140B and the second spans 142.

Furthermore, in the three diagrams of FIGS. 4, 5, and 6, the joins between the waveguides 14 of the sheet and each plane optical surface 10, 12 represented by a disk are not shown in detail to avoid cluttering the figures.

Theses joins are shown diagrammatically in FIG. 4, and they are omitted in FIGS. 5 and 6 so as to show more clearly the structure of the segments 140A, 140B and of the second spans 142.

A description follows of examples of the second embodiment of the invention in which the refractive indices of the two materials of the respective series spans 140, 142 of each waveguide 14 vary as a function of temperature in opposite directions, the description being given with reference to FIGS. 7, 8, and 9.

The following is deduced from equation (2):

$$m\lambda = (n1 + Kn2)\Delta L1$$

In this case, the two spans 140, 142 may be formed by end-to-end coupling between a waveguide 140 made of a semiconductor, e.g. InP, and a waveguide 142 made of a polymer resin, e.g. of the PMMA type.

The variation in refractive index as a function of temperature is positive for InP and negative for PMMA.

For the InP portion 140, it is possible to choose the waveguide of the structure described above with reference to FIG. 2.

The PMMA waveguide 142 may be as defined in the teaching of Document [5] "Integration of a laser diode with a polymer-based waveguide for photonic integrated circuits", N. Bonadma et al., IEEE Photonics Technology Letters, Vol. 6, No. 10, October 1994.

The effective refractive index n1 of the first structure 140 is about 3.18, and the effective refractive index n2 of the second structure 142 is about 1.5. The variations in refractive index as a function of temperature are equivalent but opposite, hence K=1 (K always being chosen to be positive). Equation (2) may be written as follows: $m\lambda = (n1+n2)\Delta L1$. For a wavelength of 1.54 µm, with a window width around this value of about 30 nm, the order m must be 1540/30=50. With a refractive index sum of 4.68, a value of 16.4 µm is obtained for ΔL1.

FIGS. 7, 8, and 9 show three phasar geometrical configurations of the second embodiment satisfying the path-length difference $(n1+n2)\Delta L1$.

FIG. 7 diagrammatically shows a geometrical configuration in which the two spans 140, 142 are formed of rectilinear waveguides that are mutually orthogonal and of constant spacing between adjacent waveguides, which waveguides are firstly connected to respective ones of the plane optical surfaces 10, 12 and secondly connected together by means of 45° mirrors 150. It can be understood that ΔL1=ΔL2 if the spacing between the waveguides 140 is identical to the spacing between the waveguides 142. The angle between the two spans 140 and 142 (which angle may be different from 90°) and the spacing between or distance between the axes of the spans 140, 142 directly determine the values of ΔL1 and of ΔL2 and make it possible to obtain ΔL1≠ΔL2. However, such a structure with a 45° mirror for performing coupling between two waveguide spans 140, 142 of different types is difficult to make and to use.

It is preferable, as shown in FIGS. 8 and 9, to connect the spans 140, 142 together over waveguide portions that are substantially rectilinear.

Thus, as shown in FIGS. 8 and 9, each second span 142 is placed between two segments 140A, 140B of the first span 140.

More precisely, as shown in FIG. 8, each second span 142 is itself subdivided into two rectilinear segments 142A, 142B which are mutually orthogonal. These second segments 142A, 142B are coupled together via a 45° mirror. Each of them is also coupled to a respective and aligned first segment 140A, 140B. The mirrors 150 thus perform coupling between two segments 142A, 142B of the same type.

FIG. 9 corresponds to a waveguide configuration with conventional bends.

For example, the mirrors 150 may be implemented as described in the teaching of Document [6] FR-A-2725040 (French Patent Application No. 94 11369).

In FIG. 9, the equiphase plane starting from the inlet is referenced P1, and the equiphase plane starting from the outlet is referenced P2.

In the above description, polarization dependence is ignored.

However, in the temperature-independent (de)multiplexer of the invention, polarization independence can also be adjusted in the same way as in a conventional phasar demultiplexer.

For this purpose, reference may be made to at least three methods:

Working at different orders for TE and for TM. This method reduces the size of the window in terms of wavelength, and limits the number of channels.

Using a square structure waveguide for an index that is identical for TE and for TM. In the invention, the birefringence of the waveguide span 140 must be equal to that of the waveguide span 142. For conventional phasar demultiplexers in the literature, a single non-birefringent waveguide is used. That method is intolerant as regards geometrical configuration, thereby giving rise to manufacturing difficulties.

Using an additional waveguide span on each waveguide 14, to compensate for polarization differences.

The method may be inspired by the teaching of Document [7] "Démultiplexeur intégré sur InP indépendant de la polarisation" ("Polarization-independent integrated demultiplexer on InP"), A. Rigny et al., JNOG 96, itself based on Document [4] FR-A-2732777.

Figure 10:
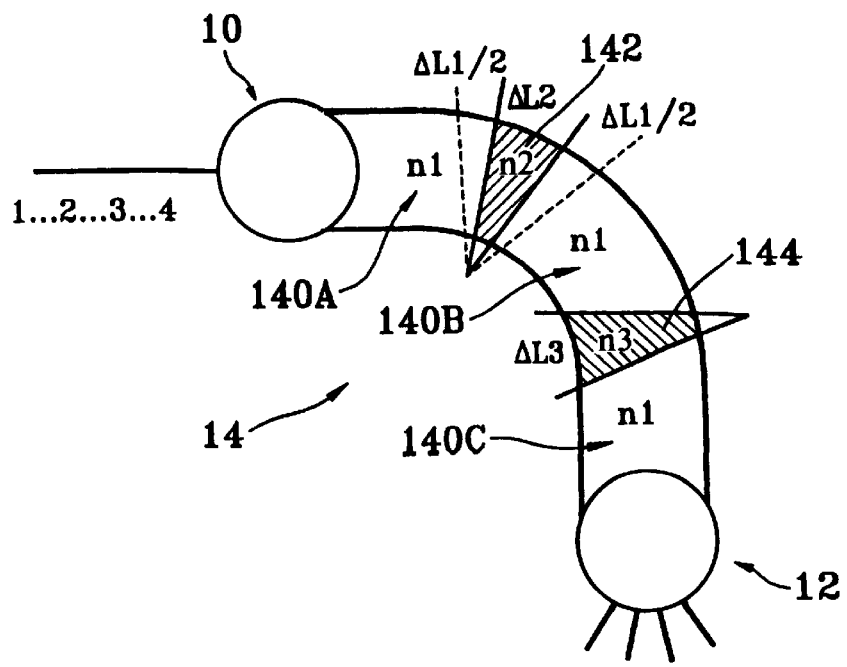
FIG. 10 is a diagrammatic plan view of a variant structure having additional compensation of polarization.

In this case, each waveguide 14 comprises at least two spans 140, 142 for controlling the effects of temperature, and at least one third span 144 in series on each waveguide for compensating polarization, the lengths of the third spans varying from one guide to another by a constant pitch ΔL3, as shown in FIG. 10.

More precisely, as shown in FIG. 10, each first span 140 is subdivided into three segments 140A, 140B, 140C which flank in pairs respectively a second span 142 and a third span 144.

The equiphase plane starting from the inlet is referenced P1, while the equiphase plane starting from the outlet is referenced P2.

To determine the length variations ΔL1, ΔL2, and ΔL3 between the respective spans 140, 142, 144 from one waveguide to another, it is necessary merely to solve the following system of three equations in three unknowns:

$$m\lambda = n1.\Delta L1 + n2.\Delta L2 + n3.\Delta L3$$

$$m.d\lambda/dT = 0 = dn1/dT.\Delta L1 + dn2/dT.\Delta L2 + dn3/dT\Delta L3 \text{ or } K1\Delta L1 + K2\Delta L2 + K3\Delta L3$$

$$m.\Delta\lambda = 0 = \Delta n1.\Delta L1 + \Delta n2.\Delta L2 + \Delta n3.\Delta L3$$

where Δn represents the index difference for the TE and TM modes;

i.e. one equation which expresses the difference in path lengths, one equation which takes temperature into account, and finally one equation which settles the problem of polarization.

The span i, where i=1, 2, 3, is characterized by its refractive index ni, its index difference (birefringence) between two polarizations Δni, and its coefficient of thermal expansion Ki that involves both the variation in index as a function of temperature and the variation in path length.

dλ/dT=Cte, this constant being chosen to be zero if temperature is to be prevented form acting on the wavelengths.

In solving the system, some ΔL values may be negative. An example is given in FIG. 10: ΔL3 is of opposite sign to ΔL1 because it decreases going towards the outside of the bend.

The accuracy of the above-mentioned system can be further improved by involving the variation in the path lengths of the waveguide spans as a function of temperature.

This variation is given in Document ECOC 96 (3.144) "Temperature independent narrow band filter by athermal waveguide", Yasuo Kokuburn et al.:

$$dS/dT = n.L\alpha_{sub} + L dn/dT$$

where S=n.L is the length of the path-length difference; and $\alpha_{sub}$ is the coefficient of thermal expansion of the substrate and n is the effective refractive index of the waveguide.

In this case, the above-mentioned system of equations can be written as follows:

$$m\lambda = n1.\Delta L1 + n2.\Delta L2 + n3.\Delta L3$$

$$m.d\lambda/dT = 0 = dS1/dT + dS2/dT + dS3/dT$$

$$m.\Delta\lambda = 0 = \Delta n1.\Delta L1 + \Delta n2.\Delta L2 + \Delta n3.\Delta L3$$

The second equation can be simplified as follows:

$$0 = (dn1/dT + n1.\alpha_{sub}).\Delta L1 + (dn2/dT + n2.\alpha_{sub}).\Delta L2 + (dn3/dT + n3.\alpha_{sub}).\Delta L3 = K1.\Delta L1 + K2.\Delta L2 + K3.\Delta L3$$

For the variants involving only semiconductor materials (first embodiment in particular), the values K1 and K2 constitute experimental data and contain both the variation in refractive index and the variation in path length as a function of temperature.

For cases involving polymers, the equations can be solved in the same way, but with K1 being taken as negative (or zero if the variation in the length of the substrate compensates the variation in the refractive index of the waveguide: see Kokuburn's ECOC 96 Publication).

To conclude, the use of three different materials and/or waveguide structures as proposed in the context of the invention makes it possible to settle the problems of temperature and of polarization dependence in a phasar-type (de)multiplexer.

Naturally, the present invention is not limited to the above-described embodiments, but rather it extends to any variant lying within the spirit of the invention.

What is claimed is:

1. A device forming an optical multiplexer and/or demultiplexer, comprising:

an InP substrate supporting two planar lenses and an array of waveguides having controlled differences in length, provided between said two planar lenses, wherein each waveguide comprises at least two spans composed of respective and different materials placed in series between said two planar lenses, a first one of said two spans being made up of three thin layers of GaInAsP having a thickness about 500 Å separated by layers of InP having a thickness about 0.55 μm, said first span having a width about 5 μm and an effective refractive index about 3.19, a second one of said two spans being made up of a quaternary GaInAsP waveguide layer and by an overlying layer of InP, provided above three thin layers of GaInAsP separated by layers of InP, said second span having a width about 2 μm and an effective refractive index about 3.21, said quaternary GaInAsP waveguide layer and overlying InP layer of the second span being etched at each end so as to present a point forming a mode matcher at each end, and wherein said first and said second spans have respective lengths, L1 and L2, that vary in opposite directions from one guide to another, the variations ΔL1 and ΔL2 in the lengths of the spans from one guide to another and the corresponding refractive indices n1 and n2 satisfying the relationship:

$$\Delta L2 = K\Delta L1$$

and $$K = (dn1/dT)/(dn2/dT)$$

so as to maintain at a constant location the positions at which various wavelengths are output from the device, regardless of temperature and to cancel out the effects of temperature.

2. A device forming an optical multiplexer and/or demultiplexer, comprising:

an InP substrate supporting two planar lenses and an array of waveguides having controlled differences in length, provided between said two planar lenses, wherein each waveguide comprises at least two spans composed of respective and different materials placed in series between said two planar lenses, a first one of said two spans being made up of three thin layers of GaInAsP separated by layers of InP, a second one of said two spans being made up of a quaternary GaInAsP waveguide layer and by an overlying layer of InP, provided above three thin layers of GaInAsP separated by layers of InP, said quaternary GaInAsP waveguide layer and overlying InP layer of the second span being etched at each end so as to present a point forming a mode matcher at each end, and wherein said first and said second spans have respective lengths, L1 and L2, that vary in opposite directions from one guide to another, the variations ΔL1 and ΔL2 in the lengths of the spans from one guide to another and the corresponding refractive indices n1 and n2 satisfying the relationship:

$$\Delta L2 = K\Delta L1$$

and $$K = (dn1/dT)/(dn2/dT)$$

wherein n1 is the refractive index of said first span n2 is the refractive index of said second span, so as to maintain at a constant location the positions at which various wavelengths are output from the device, regardless of temperature and to cancel out the effects of temperature.

3. The device of claim 2 wherein the layers of GaInAsP of said first span have a thickness about 500 Å.

4. The device of claim 2 wherein the layers of InP of said first span have a thickness about 0.55 μm.

5. The device of claim 2 wherein said first span has a width about 5 μm.

6. The device of claim 2 wherein said second span has a width about 2 μm.

7. The device of claim 2 wherein said first span has an effective refractive index about 3.19.

8. The device of claim 2 wherein said second span has an effective refractive index about 3.21.

9. A device forming an optical multiplexer and/or demultiplexer, comprising:

an InP substrate supporting two planar lenses and an array of waveguides having controlled differences in length, provided between said two planar lenses, wherein each waveguide comprises at least two spans composed of respective and different materials placed in series between said two planar lenses, said second span being etched at each end so as to present a point forming a mode matcher at each end, and wherein said first and said second spans have respective lengths, L1 and L2, that vary in opposite directions from one guide to another, the variations ΔL1 and ΔL2 in the lengths of the spans from one guide to another and the corresponding refractive indices n1 and n2 satisfying the relationship:

$$\Delta L2 = K \Delta L1$$

and $$K = (dn1/dT)/(dn2/dT)$$

so as to maintain at a constant location the positions at which various wavelengths are output from the device, regardless of temperature and to cancel out the effects of temperature.

10. A device forming an optical multiplexer and/or demultiplexer, comprising:

an InP substrate supporting two planar lenses and an array of waveguides having controlled differences in length, provided between said two planar lenses, wherein each waveguide comprises at least two spans composed of respective and different materials placed in series between said two planar lenses, said second span being etched at each end so as to present a point forming a mode matcher at each end, and wherein said first and said second spans have respective lengths, L1 and L2, that vary in the same directions from one guide to another, the variations ΔL1 and ΔL2 in the lengths of the spans from one guide to another and the corresponding refractive indices n1 and n2 satisfying the relationship:

$$\Delta L2 = K \Delta L1$$

and $$K = -(dn1/dT)/(dn2/dT)$$

so as to maintain at a constant location the positions at which various wavelengths are output from the device, regardless of temperature and to cancel out the effects of temperature.

* * * * *